(12) United States Patent
Melcher et al.

(10) Patent No.: US 7,516,639 B2
(45) Date of Patent: Apr. 14, 2009

(54) METHOD OF MAKING A STRUCTURE HAVING AN OPTIMIZED THREE-DIMENSIONAL SHAPE

(75) Inventors: Jörg Melcher, Lehre (DE); Monika Krämer, Saarbrücken (DE); Jürgen Heinrich, Clausthal-Zellerfeld (DE); Jens Günster, Clausthal-Zellerfeld (DE); Jürgen Tautz, Waldbrunn (DE)

(73) Assignee: Deutsches Zentrum fur Luft-und Raumfahrt E.V, Cologne (DE)

( * ) Notice: Subject to any disclaimer, the term of this patent is extended or adjusted under 35 U.S.C. 154(b) by 192 days.

(21) Appl. No.: 11/443,781

(22) Filed: May 31, 2006

(65) Prior Publication Data

US 2006/0267251 A1    Nov. 30, 2006

(30) Foreign Application Priority Data

May 31, 2005   (DE) .................. 10 2005 025 367

(51) Int. Cl.
*B21D 37/16* (2006.01)
(52) U.S. Cl. .................. 72/342.1; 72/364; 72/377
(58) Field of Classification Search ............... 72/342.1, 72/342.5, 342.6, 342.94, 364, 377; 264/230, 264/232, 234; 427/243, 244, 373
See application file for complete search history.

(56) References Cited

U.S. PATENT DOCUMENTS

| | | | | |
|---|---|---|---|---|
| 5,198,007 A | * | 3/1993 | Moyer et al. ............. | 55/523 |
| 5,279,737 A | * | 1/1994 | Sekhar et al. ............. | 210/490 |
| 5,572,895 A | * | 11/1996 | Hoving et al. ............. | 72/342.94 |
| 5,690,842 A | * | 11/1997 | Panchison ................. | 219/58 |
| 6,675,625 B1 | * | 1/2004 | Roche et al. .............. | 72/342.1 |
| 6,684,677 B1 | * | 2/2004 | Bar et al. ................. | 72/342.1 |
| 6,806,723 B2 | * | 10/2004 | Maruyama et al. ......... | 324/754 |
| 6,827,988 B2 | | 12/2004 | Krause et al. ............. | 427/596 |
| 6,828,026 B2 | | 12/2004 | Bretschneider et al. .... | 428/404 |
| 7,302,821 B1 | * | 12/2007 | Dariavach et al. ........ | 72/342.96 |
| 7,381,681 B2 | * | 6/2008 | Nilsson et al. ............ | 502/202 |

FOREIGN PATENT DOCUMENTS

| | | |
|---|---|---|
| CH | 122 866 A | 11/1926 |
| DE | 100 46 174 C2 | 9/2001 |
| DE | 101 02 865 A1 | 4/2002 |
| DE | 101 28 664 A1 | 1/2003 |

OTHER PUBLICATIONS

Weber, Tomandel, 1998: "Pourous $Al_xO_3$—Ceramics with Uniform Capillaries," p. 22-24.

* cited by examiner

*Primary Examiner*—Edward Tolan
(74) *Attorney, Agent, or Firm*—Thomas, Kayden, Horstemeyer and Risley, LLP

(57) ABSTRACT

A method of making a structure having an optimized sterical shape of a material 4 comprises the steps of forming a preform 1 of the structure of the material 4, setting geometric boundary conditions for the material 4 being in a state in which it is able to rearrange under the influence of internal tensions in the volume of the pre-form 1 so that the material rearranges itself into the structure in a self-organized way, and transferring the rearranged material 4 into a state in which the rearrangement of the material 4 is conserved.

14 Claims, 3 Drawing Sheets

METHOD OF MAKING A STRUCTURE HAVING AN OPTIMIZED THREE-DIMENSIONAL SHAPE

CROSS REFERENCE TO RELATED APPLICATIONS

This application claims priority to co-pending German Patent Application No. DE 10 2005 025 367.9 entitled "Verfahren zum Ausbilden einer Struktur mit optimierter Raumform" ("Method of Making a Structure Having an Optimized Sterical Shape"), filed May 31, 2005.

FIELD OF THE INVENTION

The present invention generally relates to a method of making a structure having an optimized sterical shape of a starting material.

For many applications, lightweight structures made of ceramic, metallic or polymeric materials are required. The materials can be construction materials for passive elements, on the one hand, and functional materials for active, i.e. actuator and/or sensor elements, on the other hand. As they are lightweight structures in both cases, the elements made of the materials of both groups have in common that they should be high performance structures, which can be stressed with high static and/or dynamic loads, and which bear these high loads with a minimum amount of material. In a perfect lightweight structure all areas of an element are stressed to the same extent, to both avoid stress peaks and unstressed areas. Thus, the distribution of mechanical forces is the most important criterion for a structure having an optimized sterical shape in the sense of a so-called "fully-stressed-design".

BACKGROUND OF THE INVENTION

A method of making a microstructure of a ceramic material is known from Weber, Tomandel, 1998: "*Porous $Al_2O_3$ Ceramics with uniform Capillaries*", cfi/Berichte DKG 075 (1998), p. 22-24. For producing structured components of a ceramic material, inter alia for actuator applications, a potential-based method is applied. The actuator components may, for example, be used as broad band high frequency transformers, the material being a PZT-ceramic. The method is based on the principle of an ionotropic formation of capillaries, in which uniformly distributed pore channels running in parallel to each other are formed in a ceramic matrix due to crosslinking of organic polymer brines comprising bivalent or trivalent metal cations. The common starting material of this method is a homogeneous mixture of PZT-suspension and alginalsol. The structured pre-shapes are dried after ion exchange and exchanging the water for solvent, and sintered afterwards. Starting from the wet gel up to the sintered structure a shrinking in volume of over 99% occurs. Presently, PZT-ceramic structures can be produced which have a diameter of about 2 mm and a height of 0.5 to 1 mm, the single capillaries having a diameter of about 10 µm. Although the diameter and density of the capillaries can be modified by varying the process parameters, their actual arrangement, however, is mainly based on a random process. With a random determination of the sterical shape of a structure, however, no high performance structures can be made, which have to have a sterical shape optimized for a particular application.

In the production of microstructures of ceramic materials according to classic ceramic methods, in which first a green body is made of a ceramic raw mixture and sintered afterwards, general problems occur in the formation of sterical microstructures with thin walls. The internal stresses due to shrinkage processes occurring upon sintering have the result that cracks readily occur in the area of thin walls. Thus, it is impossible to considerably get below a magnitude of 1 mm with the wall thickness of sterical structures. This applies, even if the volume shrinking upon sintering is reduced by an optimized ceramic raw mixture.

In the field of quality enhancing surface treatment, it is known to heat up an element made of a metallic material locally at its surface by means of a laser to such an extent that the melting temperature of the metal is exceeded. Thus, the metal can rearrange itself under the influence of its surface tension at the surface of the element, to form a smoothened surface. This smoothened surface is conserved upon cooling the material again below its melting temperature.

There is a need of a method of forming a structure having an optimized sterical shape from a material, in which the desired sterical shape is unerringly achieved and in which problems with inner tensions due to shrinkage of the material are avoided.

SUMMARY OF THE INVENTION

The present invention provides a methodmethod of making a structure having an optimized sterical shape of a material, the method comprising the steps of forming a pre-form for the structure of the material; setting geometric boundary conditions for the material of the pre-form being in a state in which it is able to spatially rearrange under the influence of internal tensions in the volume of the pre-form so that the material rearranges itself into the structure having the optimized sterical shape in a self-organized way; and transferring the rearranged material into a state in which the occurred rearrangement of the material is conserved.

In a more detailed aspect the invention further provides a method of making a structure having an optimized sterical shape of a material, the method comprising the steps of forming a pre-form for the structure of the material; setting geometric boundary conditions for the material of the pre-form being in a state in which it is able to spatially rearrange under the influence of internal tensions in the volume of the pre-form so that the material rearranges itself into the structure having the optimized sterical shape in a self-organized way, the geometric boundary conditions including connections of the material of the pre-form to an external support in at least two areas facing each other across the pre-form, the internal tensions including interface tensions of the material, and the structure having the optimized sterical shape being delimited by minimum faces; transferring the rearranged material into a state in which the occurred rearrangement of the material is conserved by a phase transition.

In the new method, a pre-form for the desired structure is made at first. This pre-form provides essential features of the desired structure; however, it has not yet the desired optimized sterical shape. For example, the pre-form may determine the number of openings in the structure, whereas the exact shape and the exact spatial position of these openings are still to be optimized. Similarly, the pre-shape can determine the number of contact points or connection elements of the structure, whereas the exact shape and the exact position may still to be optimized. In the pre-form, the material is in a state in which it is able to rearrange under the influence of internal tensions in the volume of the pre-form. This does not mean that the material of the entire pre-form must completely be in this stage at at least one point in time. It is, however, essential that the material of a predominant part of the pre-form gets into this state at least once, in which it is able to rearrange itself under the influence of internal tensions. Further, the material of the pre-form must to such an extent be in this state at one point in time that it is able to rearrange under the influence of internal tensions in the volume of the pre-form. In other words, it is not sufficient to have this state only at the surface of the pre-form. Preferably, the area of the material, in which the material is in that particular state, extends from one side of the pre-form through the pre-form up to the opposite side of the pre-form. With regard to the particular state itself, it is to be noted that the material is able to rearrange upon occurrence of inner tensions to such an extent that the sterical shape of the pre-form is changed, to which end a re-grouping of volume-parts of the material must be possible. In the new method, this re-grouping under the influence of internal tensions in the material occurs with geometric boundary conditions being imposed on the pre-form, by which—in addition to the internal tensions—the specifications of the optimized sterical shape of the structure to be formed are defined. Because of the unambiguousness of these specifications, the pre-conditions are met for the material of the pre-form unerringly rearranging into the structure having the optimized sterical form in a self-organized way. Afterwards, the rearranged material is transferred in a state in which the rearrangement of the material is conserved.

The state in which the material is able to rearrange itself under the influence of internal tensions can be a viscous state of the material. The actual level viscosity mainly determines the speed at which the material rearranges under the influence of internal tensions but not the optimized sterical shape, which the material strives for. This optimized sterical shape is determined by the inner tensions and the geometric boundary conditions.

Although it is also possible to directly make the pre-form of the material when it is completely in the particular state in which it is able to rearrange under the influence of internal tensions, it is often preferred to first form the pre-form and to only then transfer the material into this particular state within the volume of the pre-form. Often, this procedure makes it easier to handle the pre-form while shaping it.

Further, in this procedure, the material may be transferred into the particular state in different partial volumes of the pre-form one after the other. This is particular suitable with more complex structures and corresponding more complex pre-forms, as the danger occurs here that the structure or the specifications set for the structure by the pre-form entirely get lost when the entire material is transferred into the particular state at one point in time, because the material is then, for example, unprotected against gravity forces.

If the material is transferred in different partial volumes of the pre-form into the particular state one after the other, it is further possible to define the geometric boundary conditions under which the material rearranges into the optimized sterical shape by areas of the pre-form or of the already formed structure, in which the material is not or no longer in this particular state.

Particularly then, when the material of the entire pre-form is in the state in which it is able to rearrange under the influence of internal tensions, the geometric boundary conditions can be defined by connecting the material of the pre-form to an external support in at least two areas facing each other across the pre-form. Such a connection may, for example, be effected by negative energy of an interface between the material and the support so that the material always tends to maintain an as big as possible interface with the support even upon occurrence of internal tensions.

To transfer the entire material of the pre-form or the material within a partial volume of the pre-form into the state in which it is able to rearrange under the influence of internal tensions, its temperature can be raised. Considering ceramic materials, the increase in temperature has to be so high that not only diffusion occurs in the material, like it is sufficient for sintering, for example, but that such a high mobility is achieved that the material can indeed rearrange to essentially change its sterical shape.

The internal tensions of the material, under the influence of which it rearranges in the new method, particularly include such tensions, which are due to interface tensions of interfaces between the material and its surroundings or adjacent materials. However, the internal tensions may at least partially be caused by volume shrinkage of the material. In other words, the shrinkage in volume of the material is purposefully used in the new method but nothing which has to be inhibited to an as far extent as possible for avoiding problems.

Transferring the rearranged material into a state in which its rearrangement is conserved can be effected by a physical and/or chemical phase transition. A physical phase transition occurs, for example, upon getting below the melting or glass temperature of the material. A chemical phase transition from liquid or viscous to solid can be achieved with a change in pH with some ceramic materials, for example.

With the new method, it is possible to form microstructures and even nanostructures of various materials, particularly of functional materials, which are otherwise often extremely problematic in the formation of three-dimensional microstructures. This particularly applies to ceramic functional materials. Other ceramic structures can also be transferred into structures with optimized sterical shape in a surprisingly simple way according to the new method.

A special class of structures, which can particularly easily be produced according to the new method, are those, the optimized sterical shapes of which are delimited by so-called minimum faces. These minimum faces correspond to a sterical shape of the structures having a minimum energy. The exact course of the minimum faces thus depends on the potentials present. Correspondingly, the potentials which occur in the use of the structures have to be reflected by the inner tensions and the geometric boundary conditions in forming the structure according to the new method as exactly as possible.

For example, two- or three-dimensional comb structures with optimal sterical shape can be produced according to the new method, in which the distribution of the material over the comb structure is optimized with regard to an even stress on all parts of the material.

Other structures which can be formed with optimized sterical shape according to the new method are, for example, catenoids, trinoids, fournoids or N-noids with $N \geq 5$ as well as two-dimensional structures which correspond to a projection of these aforementioned three-dimensional structures onto a two-dimensional plane.

The new method may also be used for producing micro- or nanostructures which start from pre-forms which are in dispersion in high numbers.

Materials which can be used in the new method include ceramics, like, for example, $SiO_2$, metals, like, for example, zirconium tungstate, which shrinks upon heating, alloys, glasses, polymers and compounds (however, limited to particle compounds and fiber or rod compounds), as far as they are construction materials. The functional materials can be piezo-ceramic materials, like, for example, PZT, magnetostrictive materials, like, for example, rare earth alloys, such as terfenol, ferroic materials, like, for example, photo-ferroelectrics, shape memory alloys, like, for example, NiTi or even piezo-electric polymers, like, for example, PVDF.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
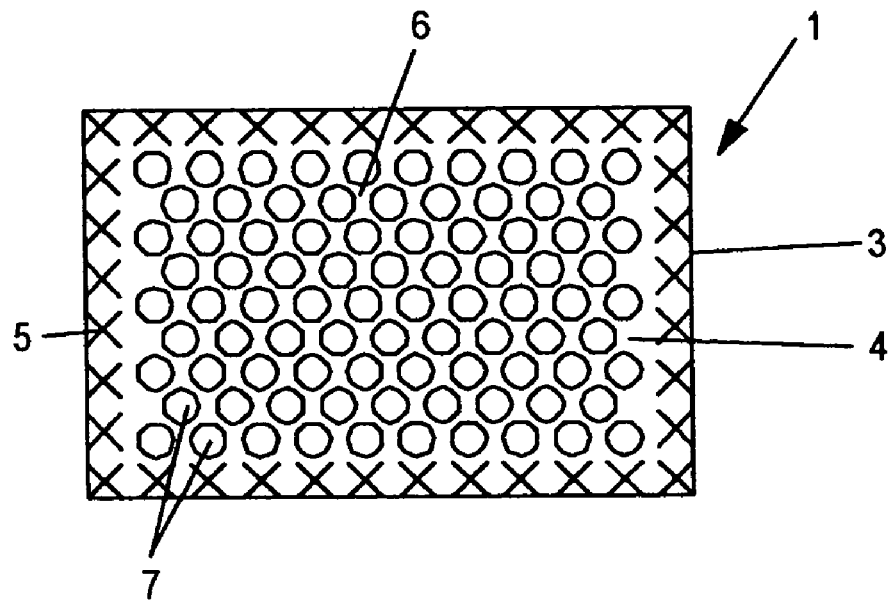
FIG. 1 shows a pre-form for a comb structure.
Figure 2:
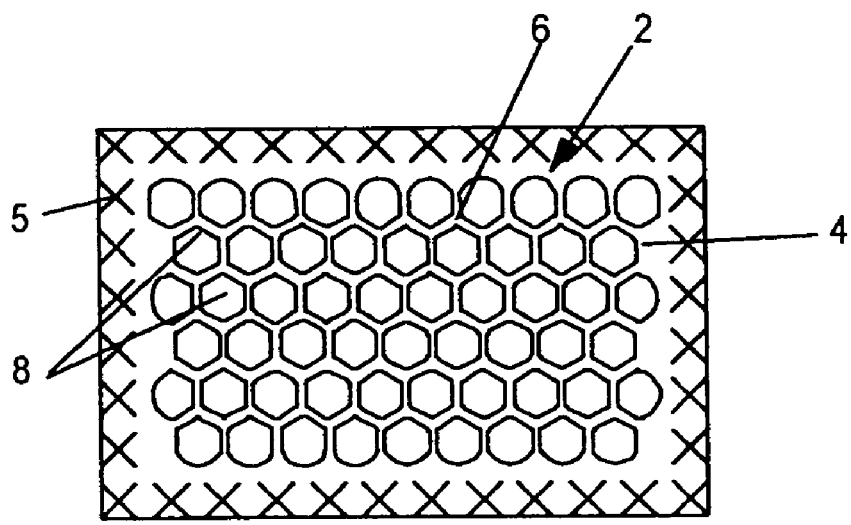
FIG. 2 shows a structure with optimized sterical shape made of from the pre-form according to FIG. 1.

Referring now in greater detail to the drawings, FIG. 1 shows a pre-form 1 for a structure 2 depicted in FIG. 2 which is a comb structure. The pre-form 1 is a green body 3 of ceramic material 4. In the boundary 5 of the pre-form 1, which is indicated by cross hatching, the ceramic material 4 has a composition different from its composition in the middle area 6 of the pre-form 1. In the middle area 6, the pre-form 1 is provided with cylindrical openings 7. The cylindrical openings 7 are in a hexagonal spatial arrangement. The differences in the composition of the ceramic material 4 in the boundary 5 and in the middle area 6 have the result that upon heating the pre-form 1, the ceramic material 4 is already viscous in the middle area 6, when it is still solid and stable in shape in the boundary 5. If this distribution of the viscous and the solid states is purposefully provided, the material rearranges in the middle area 6 under the influence of internal tensions, whereas the boundary 5 defines geometric boundary conditions for this rearrangement. The internal tensions, under which the rearrangement of the material 4 occurs are due to interface tensions of the material 4 with regard to its surroundings, on the one hand, and due to shrinkage in volume of the material 4, for example, caused by solvent degassing out of the green body 3, on the other hand. Under these conditions, the material itself rearranges in a self-organized way into the comb structure according to FIG. 2 having an optimized sterical shape, i.e. into a comb structure with a minimum potential energy or with a uniform stress on the entire material 4. The cylindrical openings 7 according to FIG. 1 are reshaped into channels 8 with a rounded hexagonal cross-section in the structure 2 of FIG. 2. The channels 8 show further deviations from the cylinder shape in the depth direction running normal to the drawing plane of FIGS. 1 and 2, which are also caused by energy minimization (these deviations are not depicted in FIG. 2).

Figure 3:
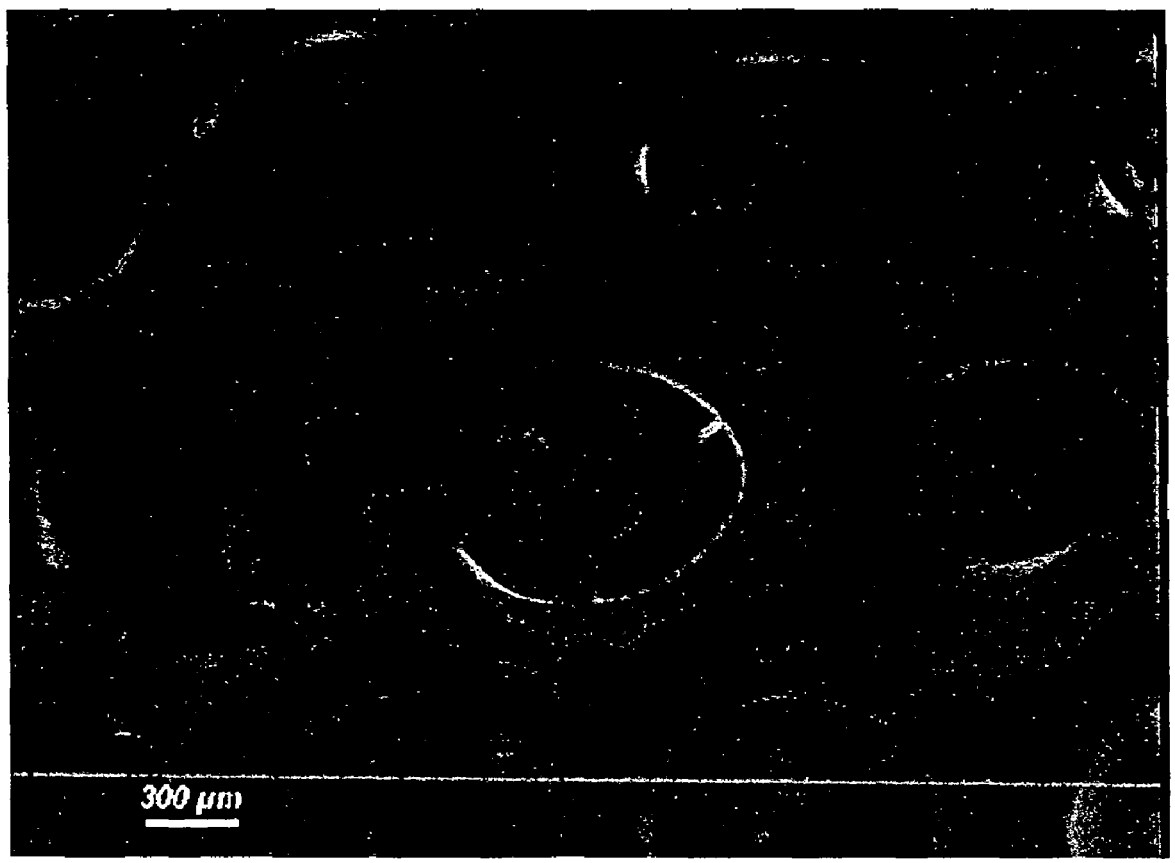
FIG. 3 shows a picture of a detail of the structure according to FIG. 2 taken with a microscope.

FIG. 3 is a microscopic representation of a comb structure being a ceramic microstructure which has been produced according to the new method. The actual procedure was as follows: a green body having a density of about 80% by volume was made of colloidal SiO$_2$-gel in a slurry pressure diecasting procedure. Afterwards, the green body was dried and structured by a milling process to provide the cylinder-shaped openings 7 according to FIG. 1. Then, a partial area of this pre-form was heated up with energy-rich light from a laser up to an increased sinter temperature (of about 1450° C.). The adjacent areas of the pre-form not heated up with the laser were not subject to sinter shrinkage and thus defined the geometric boundary conditions for the area in which the ceramic material was able to rearrange under the influence of internal tensions. This resulted into the structure visible in FIG. 3, in which a hexagonal cross-section is easily noted in the optimized sterical shape of the openings.

Figure 4:
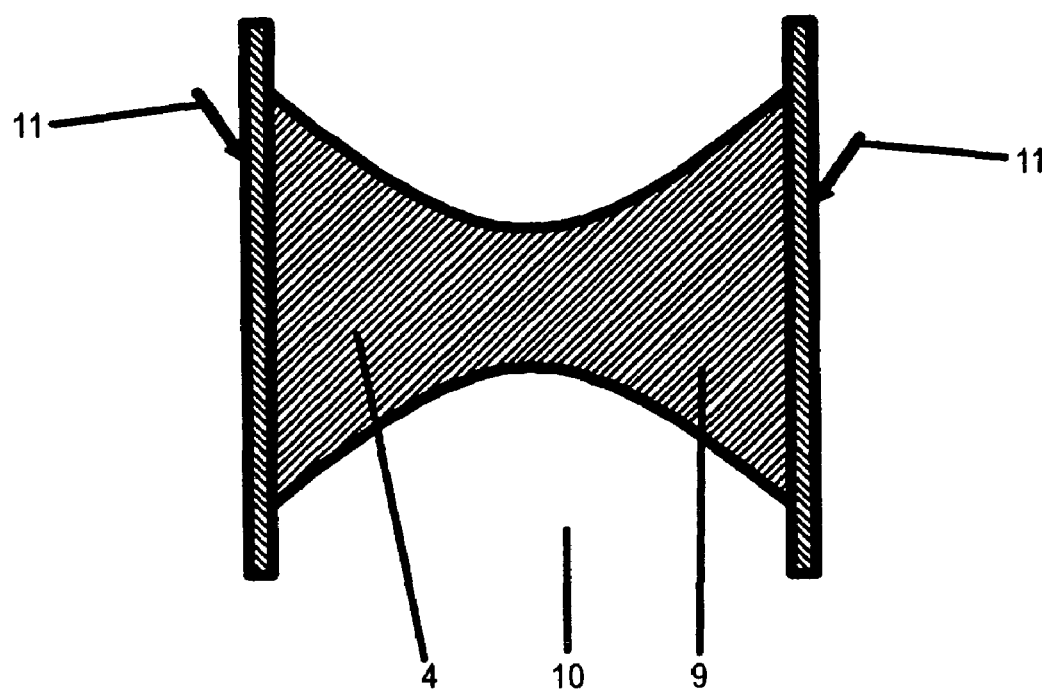
FIG. 4 shows another structure having a sterical shape which has been produced according to the new method.

FIG. 4 indicates the application of another embodiment of the new method, in which a slurry 9, i.e. an aqueous suspension of a ceramic powder, is placed on a plane, horizontal, hydrophobic substrate 10 as the material 4. Under the boundary condition of its gravity force, the slurry 9 tends to minimize its interface with the hydrophobic substrate 10 due to the high energy of the interface with the hydrophobic substrate. At the same time two hydrophilic barriers 2, which are arranged in parallel and which contact the slurry 9, are provided. As the energy of the interface of the slurry 9 with the barriers 11 is negative, the slurry 9 tends to maximize its interfaces with the barriers 11. Thus, the slurry 9 rearranges into the sterical shape indicated in FIG. 4 in a self-organized way, which corresponds to an energy minimum. Driving forces are the internal tensions within the slurry 9 because of the interface tensions with regard to the hydrophobic substrate 10 and the barriers 11. Further, the interface tension with regard to the surrounding air and the gravity force on the slurry are relevant. By influencing these interface tensions by means of surfactants the boundary conditions for forming the sterical shape of the slurry 9 can be varied to tune this sterical shape to various applications of the structure which results when the slurry 9 is cured. Curing is achieved here by changing the pH of the slurry 9. Curing a suspension of a ceramic powder by means of changing its pH is known from coagulation molding. Alternatively, such a slurry may also be transformed into a solid substance by vinyl polymerization, for example. This corresponds to the procedure in so-called gel casting.

Figures 5, 6, 7, 8, 9:
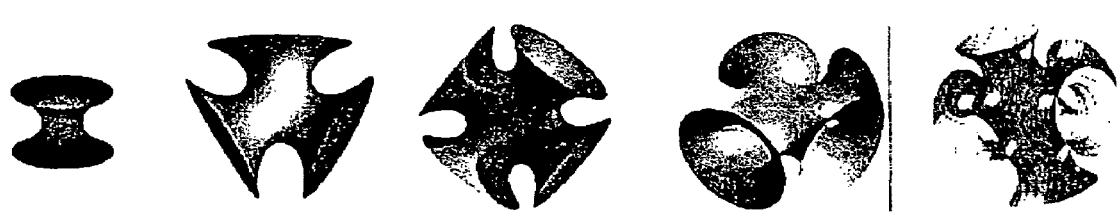
FIGS. 5 to 9 show further examples of three-dimensional structures which can be produced with an optimized three-dimensional shape according to the new method.

FIGS. 5 to 9 indicate various other structures having an optimized sterical shape, which can be produced according to the new method. These are a katenoid (FIG. 5), a trinoid (FIG. 6), a fournoid (FIG. 7), a 5-noid (FIG. 8) and a 6-noid (FIG. 9). These structures are each delimited by minimum faces (in a geometrical sense), and, upon mechanically stress, they display an absolute uniform distribution of the load on the material used, if the boundary conditions consisting of the internal tensions and the geometric boundary conditions during their production have been properly tuned to the conditions of their later practical application.

Many variations and modifications may be made to the preferred embodiments of the invention without departing substantially from the spirit and principles of the invention. All such modifications and variations are intended to be included herein within the scope of the present invention, as defined by the following claims.

LIST OF REFERENCE NUMERALS 1 pre-form
2 structure
3 green body
4 material
boundary area
6 middle area 7 opening
8 channel
9 slurry
10 hydrophobic substrate
11 hydrophilic barrier

We claim:

1. A method of making a structure having an optimized sterical shape of a material, the method comprising the steps of:
   forming a pre-form for the structure of the material,
   transferring the material of the pre-form into a viscous state in which it is able to spatially rearrange under the influence of internal tensions in different partial volumes of the pre-form one after the other,
   setting geometric boundary conditions for the material of the pre-form being in the viscous state by defining areas of the pre-form, in which the material is not in the state in which it is able to rearrange under the influence of internal tensions, so that the material in the viscous state rearranges itself into the structure having the optimized sterical shape in a self-organized way, and
   transferring the rearranged material into a state in which the occurred rearrangement of the material is conserved.

2. The method of claim 1, wherein the step of setting geometric boundary conditions further includes connecting the material of the pre-form to an external support in at least two areas facing each other across the pre-form.

3. The method of claim 1, wherein the material is transferred into the state in which it is able to rearrange under the influence of internal tensions by increasing its temperature.

4. The method of claim 1, wherein the internal tensions include interface tensions of the material.

5. The method of claim 1, wherein the internal tensions are at least partially due to shrinkage in volume of the material.

6. The method of claim 1, wherein the rearranged material is transferred into the state in which the rearrangement of the material is conserved by a phase transition selected from physical and chemical phase transitions and combinations thereof.

7. The method of claim 1, wherein the material is a functional material.

8. The method of claim 1, wherein the material is a ceramic material.

9. The method of claim 1, wherein the structure having the optimized sterical shape is delimited by minimum faces.

10. The method of claim 1, wherein the structure having the optimized sterical shape is selected from two- and three-dimensional comb structures.

11. The method of claim 1, wherein the structure having the optimized sterical shape is selected from the group consisting of catenoids, trinoids, fournoids and N-oids with $N \geq 5$.

12. The method of claim 1, wherein the structure having the optimized sterical shape is selected from the group consisting of micro- and nanostructures.

13. A method of making a structure having an optimized sterical shape of a material, the method comprising the steps of:
   forming a pre-form for the structure of the material;
   transferring the material of the pre-form into a viscous state in which it is able to spatially rearrange under the influence of internal tensions in different partial volumes of the pre-form one after the other,
   setting geometric boundary conditions for the material of the pre-form being in the viscous state by defining areas of the pre-form, in which the material is not in the state in which it is able to rearrange under the influence of internal tensions, so that the material in the viscous state rearranges itself into the structure having the optimized sterical shape in a self-organized way,
   the geometric boundary conditions including connections of the material of the pre-form to an external support in at least two areas facing each other across the pre-form,
   the internal tensions including interface tensions of the material, and
   the structure having the optimized sterical shape being delimited by minimum faces;
   transferring the rearranged material into a state in which the occurred rearrangement of the material is conserved by a phase transition.

14. The method of claim 13, wherein the structure having the optimized sterical shape is selected from the group consisting of catenoids, trinoids, fournoids and N-noids with $N \geq 5$.

* * * * *